United States Patent
Davenel

(10) Patent No.: US 10,481,007 B2
(45) Date of Patent: Nov. 19, 2019

(54) SYSTEM FOR DETECTING ELECTROMAGNETIC RADIATION

(71) Applicant: SAFRAN ELECTRONICS & DEFENSE, Boulogne Billancourt (FR)

(72) Inventor: Arnaud Davenel, Boulogne Billancourt (FR)

(73) Assignee: SAFRAN ELECTRONICS & DEFENSE, Boulogne Billancourt (FR)

(*) Notice: Subject to any disclaimer, the term of this patent is extended or adjusted under 35 U.S.C. 154(b) by 0 days.

(21) Appl. No.: 16/464,855

(22) PCT Filed: Dec. 5, 2017

(86) PCT No.: PCT/EP2017/081552
§ 371 (c)(1),
(2) Date: May 29, 2019

(87) PCT Pub. No.: WO2018/104317
PCT Pub. Date: Jun. 14, 2018

(65) Prior Publication Data
US 2019/0301943 A1    Oct. 3, 2019

(30) Foreign Application Priority Data
Dec. 6, 2016    (FR) ...................... 16/62017

(51) Int. Cl.
*G01J 5/06*    (2006.01)
*G01J 5/08*    (2006.01)
*G01J 5/00*    (2006.01)

(52) U.S. Cl.
CPC ............. *G01J 5/061* (2013.01); *G01J 5/0862* (2013.01); *G01J 2005/0048* (2013.01)

(58) Field of Classification Search
CPC ... G01J 5/061; G01J 5/0862; G01J 2005/0048
See application file for complete search history.

(56) References Cited

U.S. PATENT DOCUMENTS

| 4,937,450 A | 6/1990 | Wakabayashi et al. |
| 5,408,100 A | 4/1995 | Gallivan |
| (Continued) | | |

FOREIGN PATENT DOCUMENTS

FR    2887627 A1    12/2006

OTHER PUBLICATIONS

Mar. 5, 2018 International Search Report issued in International Patent Application No. PCT/EP2017/081552.

*Primary Examiner* — Mark R Gaworecki
(74) *Attorney, Agent, or Firm* — Oliff PLC; R. Brian Drozd

(57) ABSTRACT

An electromagnetic-radiation detection system is equipped with an electromagnetic-radiation sensor, which has a plurality of detectors sensitive to electromagnetic radiation, allowing images composed of pixels to be obtained, each pixel being represented by at least one value issuing from at least one detector of the sensor. These sensors should generally be cooled. Because of dispersion of the individual responses of each detector of a sensor, each detector of said sensor is calibrated for gain and offset value. A calibration of a detector includes acquiring at least two values issuing from said detector in order to estimate a gain and an offset value to be applied to the values issuing from said detector. A bandpass electromagnetic-radiation filter may have a predefined transmission coefficient in said system in order to vary the electromagnetic radiation reaching said sensor and thus to obtain, for each detector, the two values necessary for implementing calibration.

8 Claims, 5 Drawing Sheets

(56) References Cited

U.S. PATENT DOCUMENTS 6,222,454 B1  4/2001  Harling et al.
2011/0181730 A1  7/2011  Cabib et al.

SYSTEM FOR DETECTING ELECTROMAGNETIC RADIATION

The invention relates to a system for detecting electromagnetic radiation, such as infrared radiation.

Electromagnetic-radiation detection systems are normally used for equipping homing heads of self-guided projectiles, of the missile or rocket type, drones or thermal cameras, binoculars and spectacles for night vision, telescopes and more generally any observation device based on the detection of electromagnetic radiation.

Generally, electromagnetic-radiation detection systems are equipped with an electromagnetic-radiation sensor of the FPA (focal plane array) matrix type. An electromagnetic-radiation sensor, simply referred to as a sensor hereinafter, is composed of a plurality of detectors sensitive to electromagnetic radiation, such as thermodetectors or photodetectors. Each photodetector transforms for example the photons issuing from electromagnetic radiation into electron-hole pairs by photoelectric effect and then collects the electrons in a potential well. Filling of the potential well is then spoken of. The number of electrons collected is proportional to the number of photons received. These sensors allow to obtain images composed of pixels, each pixel being represented by at least one value issuing from at least one detector of said sensor, each value being dependent on a level of filling of the potential wells with electrons. In order to prevent the wells being filled by electron-hole pairs generated by the photosensitive material of the sensor (i.e. the substrate), these sensors must be cooled.

Furthermore, in order to prevent photons, referred to as stray photons, emitted outside an observation field of an electromagnetic-radiation detection system, also creating unnecessary electron-hole pairs, said system comprises a cooled diaphragm. This diaphragm limits the number of stray photons reaching the sensor.

Each cooling (of the substrate and of the diaphragm) is carried out by a cryostat (a "dewar").

Because of an effect of dispersion of the individual responses of each detector of a sensor, it is essential to calibrate each detector of said sensor for gain and offset value. Since calibration for gain equates to measurement of a slope of a curve, it is necessary to acquire at least two signals (i.e. two values) corresponding to two different well fillings. As for the offset value, this is taken at a well filling point. Such a series of acquisitions is in general called two-point calibration and sometimes three-point calibration. So that each measurement is relevant, the fillings must vary for a fixed integration time. They must therefore correspond to different scenes. Furthermore, with a view to correcting photometric effects, the complete optical system is ideally taken into account in each of the measurements.

FIG. 1A shows response curves of first and second detectors of a detector of a sensor according to a scene temperature.

A curve 1 represents the response curve of a first detector. A curve 2 represents the response curve of a second detector. The response curves of the first and second detectors are completely different both in slope and point of origin. One objective of the calibration is to ensure that the response curve of each detector corresponds to an ideal response curve shown in FIG. 1 by a curve 3.

FIG. 1B shows a first calibration step during which the slope of the response curve of each detector is corrected. A function allowing to determine a gain value to be applied to the response curve according to a scene temperature value is then determined for the first and second detectors. As shown in FIG. 1B, an application of this function to curves 1 and 2 allows to straighten these curves so as to obtain curves having a slope identical to curve 3.

FIG. 1C shows a second calibration step during which the offset value of the response curve of each detector is corrected.

The offset value of each curve is determined so as to obtain a response curve coincident with the ideal curve for each detector.

Conventionally, the gains are calculated once in the factory while the offset values are calculated in the product (that is to say on the site of use of the electromagnetic-radiation detection system). However, numerous FPA matrices, for example those composed of MCT (mercury cadmium telluride), exhibit instabilities in gain. Consequently, for a detector of a sensor, the gain correction applied is erroneous and the correction for offset value cannot compensate for this error. The detector concerned is then wrongly corrected. These wrong corrections may, in an image produced by the sensor, cause appearances of pixels, referred to as atypical pixels, that are inconsistent with the other pixels of the image. These gain instabilities are all the more a problem since the pixels affected vary from one use to another (i.e. from one start-up to another) of the electromagnetic-radiation detection systems. In addition, since the electromagnetic-radiation detection systems have a relatively long service life (for example from 15 to 20 years), these instabilities in gain may also be related to ageing of the sensor during this service life.

In order to identify these atypical pixels, several strategies are possible. In the factory and by "anticipation", so-called "hardened" calibration methods carry out successive calibrations in order to increase a probability of detecting the pixels where the gain varies or risks varying in the future.

In order to manage ageing of the sensors, certain methods attempt to demonstrate the stability of the gains of the sensor over the service life of the electromagnetic-radiation detection system. Another solution consists of carrying out calibrations during the service life of the electromagnetic-radiation detection device.

These calibration methods are lengthy and expensive. Moreover, they require being carried out on the test bench, which means that, in the case of regular calibration, the electromagnetic-radiation detection system must be regularly taken to and immobilised in the factory.

Embedded calibration methods, referred to as active methods, are however being developed little by little. The main advantage of these methods is not requiring a return to the factory for implementation thereof. A method for the a posteriori detection of atypical pixels by analysing offset values and another one using a two-point calibration device using black bodies embedded in the electromagnetic-radiation detection system and allowing to calculate the gains as a product are known. The existing active method makes the optical system appreciably more complex and must generally use a Peltier module for obtaining thermoelectric cooling. Using a Peltier module causes an increase in the consumption of electricity and problems of space requirement in the electromagnetic-radiation detection system due to the volume occupied by the Peltier module. It is noted in addition that these active methods cannot be external (except in exceptional cases), which may cause erroneous calculations of gains.

The passive and active calibration methods are generally based on a detection of atypical pixels by observing the gains and/or the offset values of the corresponding detectors. A large number of atypical pixel detection methods exist.

These methods allow to identify a major part of the atypical pixels but do not generally allow to identify all of them. Frequently, in addition, these methods declare "for safety" (i.e. over-declare) that valid pixels are atypical pixels.

It is desirable to overcome these drawbacks of the prior art. It is in particular desirable to propose an electromagnetic-radiation detection system integrating means for implementing an active calibration method that functions without a Peltier module, which does not over-declare atypical pixels, and which allow to avoid use of a hardened calibration. It is also desirable for the electromagnetic-radiation detection system to allow a two-point calibration.

According to a first aspect of the present invention, the present invention relates to an electromagnetic-radiation detection system comprising: a casing defining an enclosure in which a partial vacuum prevails, comprising a window transparent to said electromagnetic radiation; a cold finger having a side wall closed at one end by an end wall situated in line with the window; a sensor, mounted on the end wall, having a flat top surface disposed facing the window comprising detectors sensitive to electromagnetic radiation and cooled by the cold finger, said sensor defining an optical axis perpendicular to the flat top surface and centred with respect thereto; a cold screen surrounding the sensor, substantially in the form of a dome, mounted on the cold finger and generated by rotation about the optical axis, and comprising a top end, disposed between the window and the sensor, defining a circular-shaped diaphragm centred on the optical axis and a side wall connecting a base of the cold screen to the top end having an internal face with its concavity turned towards the optical axis. The system comprises: at least one bandpass electromagnetic-radiation filter having a predefined transmission coefficient, each filter being movable and being able to adopt a first position in which it is placed outside the casing facing the window and a second position in which it is placed so as to not filter any electromagnetic radiation received by the system, in said first position each filter has in cross section in any secant plane containing the optical axis a concave form turned towards the sensor having a profile with a conical and/or aspherical base and reflects the focal plane inside the casing; and processing means for evaluating, for each detector of the sensor, a gain and an offset value using a first value supplied by said detector when each filter is in the second position and at least one second value supplied by said detector when a filter among the at least one filter is in the first position.

The use of at least one filter in the electromagnetic-radiation detection system allows to carry out at least two-point calibration of each detector of the sensor simply. This system then does not comprise a Peltier module.

According to one embodiment, at least one first filter among the at least one filter has a surface, any cross section of which through a plane containing the optical axis is in the form of an ellipse or a circle truncated by a plane perpendicular to the optical axis and generated by rotation about the optical axis.

According to one embodiment, at least one filter among the at least one filter reflects the focal plane inside the cold screen.

According to one embodiment, each focus of the ellipse of the cross section in the form of a truncated ellipse or of the circle of the cross section in the form of a truncated circle of the first filter is placed on the edge of the window.

According to one embodiment, the casing comprises an internal surface reflecting the electromagnetic radiation and the cold screen comprises an external surface absorbing the electromagnetic radiation.

According to one embodiment, each focus of the ellipse of the cross section in the form of a truncated ellipse or of the circle of the cross section in the form of a truncated circle of the first filter is placed on the edge of the diaphragm.

According to a second aspect of the invention, the invention relates to a method for calibrating detectors sensitive to electromagnetic radiation of a sensor used by the electromagnetic-radiation detection system according to the first aspect. The method comprises: positioning a filter among the at least one filter in the first position; triggering an acquisition of a first matrix of values by the sensor, each value in the matrix of values issuing from a detector of the IR sensor; positioning said filter in the second position; triggering an acquisition of a second matrix of values by the sensor; determining, for each detector of the sensor, a gain and an offset value to be applied to the values issuing from said detector, each determination of a gain and of an offset value of a detector uses a value of the first matrix corresponding to said detector and a value of the second matrix corresponding to said detector.

According to a third aspect of the invention, the invention relates to a computer program comprising instructions for the implementation, by a device, of the method according to the second aspect, when said program is executed by a processor of said device.

According to a fourth aspect of the invention, the invention relates to storage means storing a computer program comprising instructions for the implementation, by a device, of the method according to the second aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context of an infrared radiation (IR) detection system. The invention applies however to any electromagnetic-radiation detection system and for radiations other than infrared radiation.

Figure 1A:
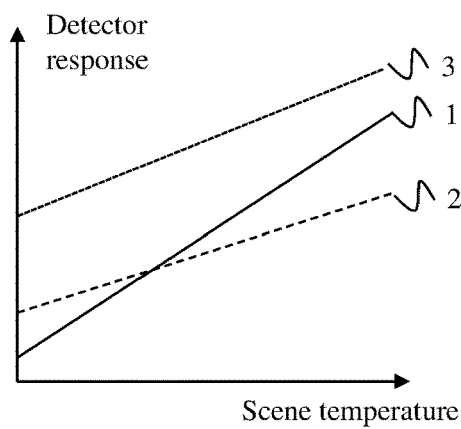
FIG. 1A shows the response curves of a first and second detector of a sensor according to a scene temperature.
Figure 1B:
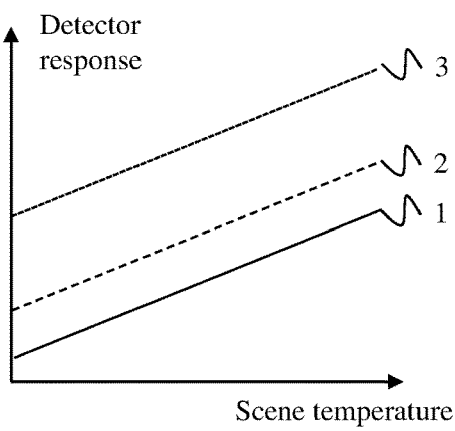
FIG. 1B shows a first calibration curve during which the slope of the response curve of each detector is corrected.
Figure 1C:
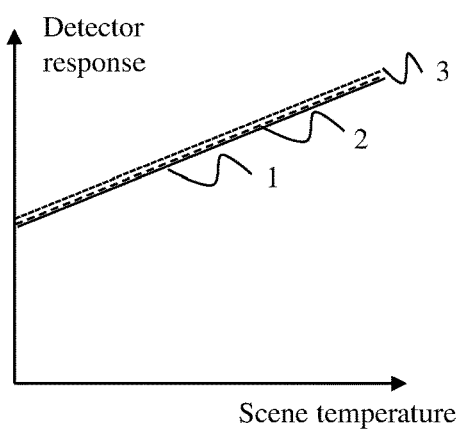
FIG. 1C shows a second calibration step during which the offset value of the response curve of each detector is corrected.
Figure 2:
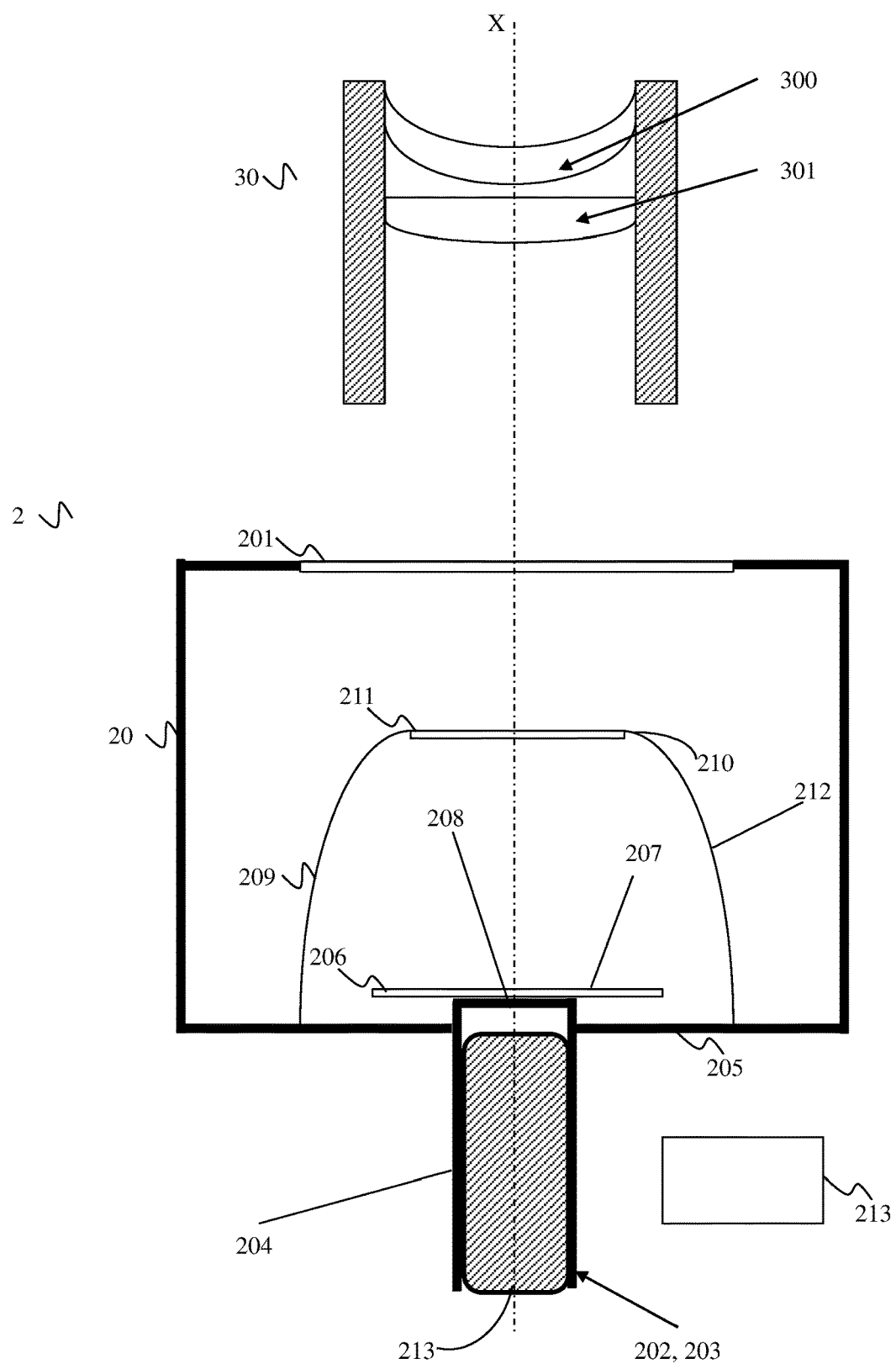
FIG. 2 shows a cross section view of an infrared radiation detection system according to the prior art.

FIG. 2 shows a cross section view of an infrared radiation detection system according to the prior art.

An infrared radiation detection system 2, referred to as an IR system hereinafter, comprises a casing 20 defining an enclosure in which a partial vacuum (approximately $10^{-6}$ bar) prevails, provided with a window 201 transparent to IR radiation.

The IR system 2 comprises a cold finger 202 comprising a cryostat (dewar) 203 able to receive a heat exchanger 213.

The cold finger 202 has a side wall 204 closed at one end by an end wall 208 situated in line with the window 201.

The infrared sensor 207, referred to as an IR sensor hereinafter, is mounted on the end wall 208 so as to be able to be struck by IR radiation passing through the window 207, while being cooled by the cold finger 202. The IR sensor 207 has a flat top surface 206, rectangular or circular, disposed opposite the window 201 and consisting of a matrix of detectors sensitive to IR radiation. The IR sensor 207 defines an optical axis X perpendicular to the flat top surface 206 and centred with respect thereto.

In many applications, IR systems are used to observe at least one object in a scene. Said scene may be divided into two zones: a first zone comprising the object, and a second zone comprising everything that does not form part of the object, which will be referred to as the background. The object and the background generally have similar temperatures, around 300° K, and therefore generate similar IR radiations. Under these conditions, it may be difficult to distinguish the object from the background. To overcome this problem, IR systems generally have a field of vision limited so as to limit the radiation perceived by the sensor coming from the background of the object being observed. As seen above, such a limitation is for example obtained by interposing a cooled diaphragm between the object being observed and the sensor.

The IR system 1 therefore comprises a cold screen 212 substantially in the form of a dome surrounding the IR sensor 207, mounted on the cold finger 202 and generated by rotation about the optical axis X of the IR sensor 207. The cold screen 212 is intended to limit any IR radiation liable to reach the IR sensor 207. The cold screen 212 has a base 205, by means of which the cold screen 212 is mounted on the cryostat 203. The cold screen 212 moreover comprises a top end 210, disposed between the window 201 and the IR sensor 207 defining a circular-shaped diaphragm 211 centred on the optical axis X The cold screen 212 also comprises a side wall 209 connecting the base 205 to the top end 210. The side wall 209 has an internal face with its concavity turned towards the optical axis X.

The IR system 2 also comprises a lens system 30 suitable for focusing IR radiation emanating from an object being observed onto the IR sensor 207. The lens system 30 may comprise a plurality of optical elements. In one embodiment, the lens system 30 comprises a first front lens 300 and a second intermediate lens 301. Each lens is transmissive for a set of electromagnetic wavelengths corresponding to an infrared band of interest for the IR system 2. The lens system 30 is associated with a focal plane perpendicular to the optical axis X The IR sensor 207 is situated in the focal plane associated with the lens system 30.

It should be noted that the lens system 30 is external to the cryostat and is therefore not cooled.

Moreover, the IR system 3 comprises a processing module 213 that we describe below in relation to FIG. 5. The processing module 213 receives a matrix of values from the IR sensor 207, each value issuing from a detector of the IR sensor 207. The processing module 213 applies processing to each of the values received in order to generate an image from the matrix of values. The processing module 213 applies in particular a gain and a predefined offset value to each of the values of the matrix of values.

Figure 5:
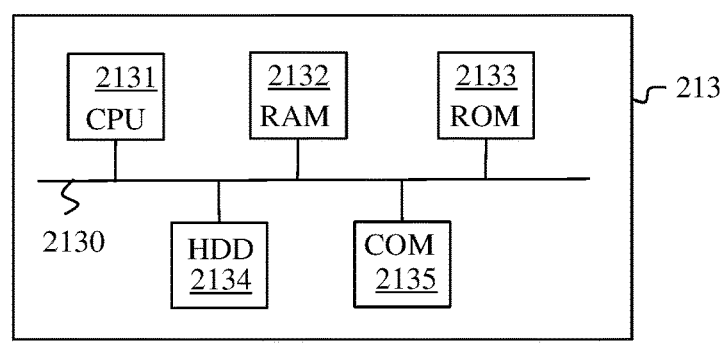
FIG. 5 illustrates schematically an example of hardware architecture of a module for processing data issuing from an IR sensor.

FIG. 5 illustrates schematically an example of hardware architecture of a module 213 for processing values issued from the IR sensor 207.

According to the example of hardware architecture shown in FIG. 5, the processing module 213 then comprises, connected by a communication bus 2130: a processor or CPU (central processing unit) 2131; a random access memory (RAM) 2132; a read only memory (ROM) 2133; a storage unit such as a hard disk or a storage medium reader, such as an SD (secure digital) card reader 2134; at least one communication interface 2135 enabling the processing module 213 to communicate with, for example, the IR sensor 207 and an image display module that is not shown.

The processor 2131 is capable of executing instructions loaded into the RAM 2132 from the ROM 2133, from an external memory (not shown), from a storage medium (such as an SD card), or from a communication network. When the IR system 2 is powered up, the processor 2131 is capable of reading instructions from the RAM 2132 and executing them. These instructions form a computer program causing the implementation, by the processor 2131, of methods for processing values issuing from the detectors of the IR sensor 207. As we describe hereinafter, the processing system 213 is in particular able to implement a method according to the invention, described in relation to FIG. 6, for evaluating a gain and an offset value for each detector of the IR sensor 207.

Figure 6:
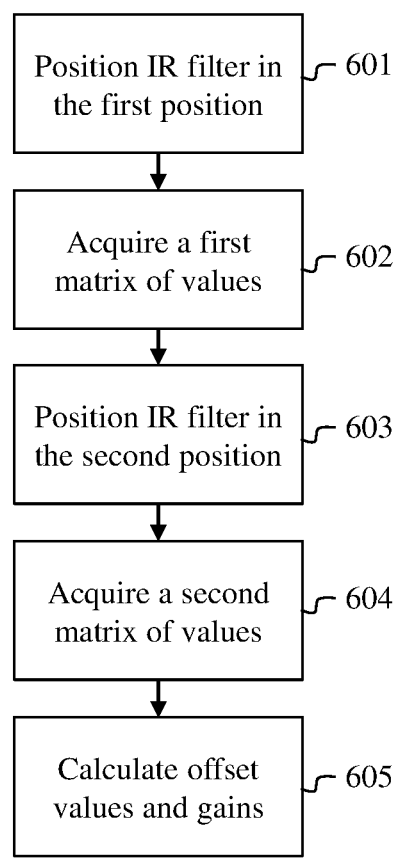
FIG. 6 shows a calibration method according to the invention.

The methods used by the processing system 213, and in particular the method described in relation to FIG. 6, may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 3:
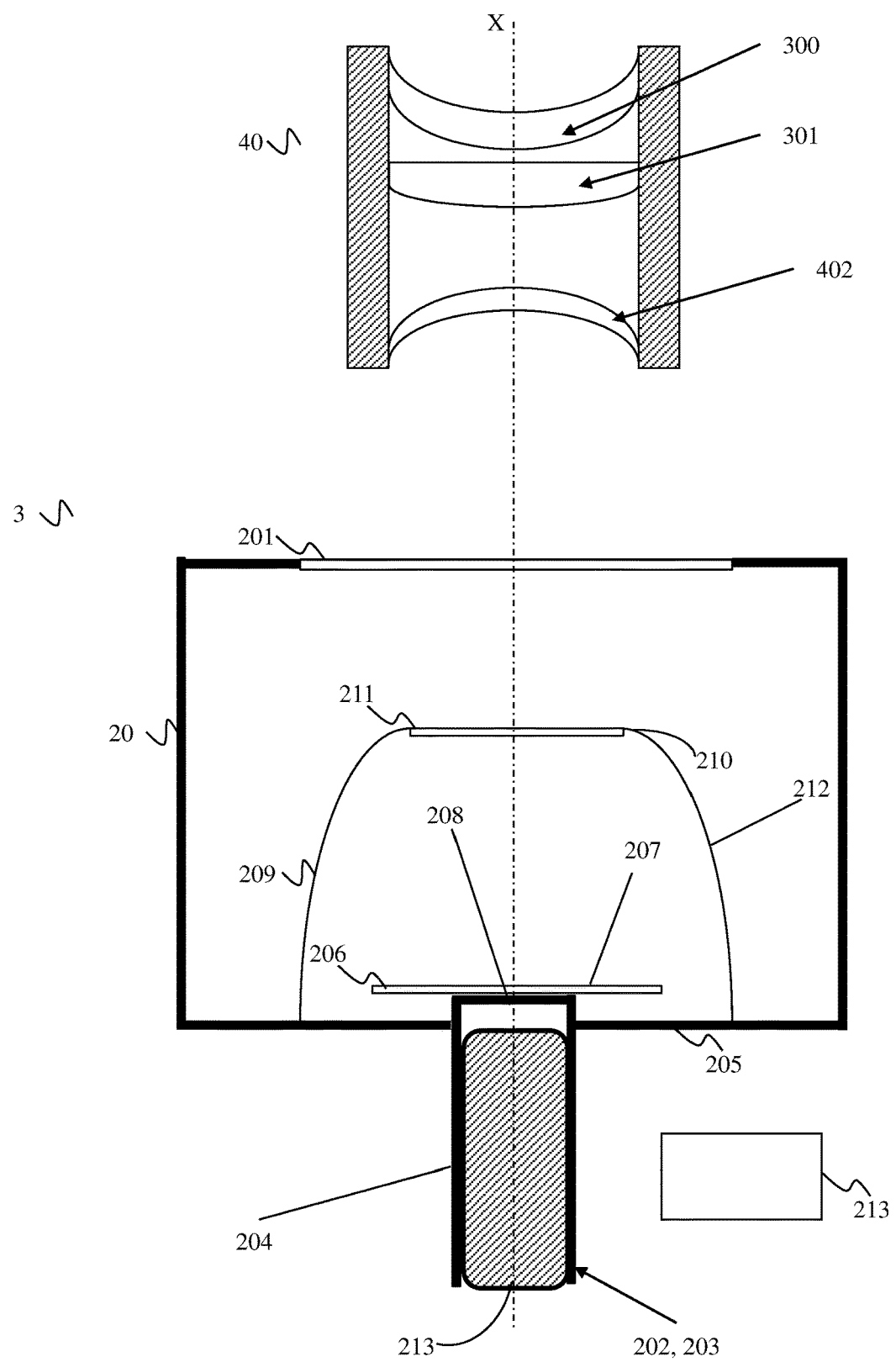
FIG. 3 shows a cross section view of an infrared radiation detection system according to the invention.

FIG. 3 shows a view in cross section of an infrared radiation detection system according to the invention.

The IR system 3 of FIG. 3 repeats the IR system 2 in FIG. 2. Each identical element in FIGS. 2 and 3 keeps the same reference. New elements or modified elements have different references.

In one embodiment, the casing 20 remains in every way identical in FIGS. 2 and 3. On the other hand, the lens system 30 is replaced by a lens system 40. In the lens system 40, there are the front lenses 300 and intermediate lenses 301. The lens system 40 is associated with a focal plane perpendicular to the optical axis X in which the IR sensor 207 is situated.

A major difference between the IR system 3 and the IR system 2 lies in an insertion of at least one infrared filter, referred to as an IR filter hereinafter, at the entry to the casing 20 (i.e. outside the casing 20 opposite the window 201). As we shall see hereinafter, the objective of the insertion of at least one IR filter in the IR system 3 is to allow at least one two-point calibration. Each IR filter inserted is a movable bandpass filter, of given transmission T, that is moved in front of the window 201. By changing the IR filter, because of the different transmissions T of said IR filters, the fillings of the wells vary in accordance with the requirements related to a two-point calibration and allow to calculate the gains and offset value of each detector of the IR sensor 207 (i.e. by modulating the electron filling level of the potential wells of the detectors of the IR sensor 207 without changing the integration time and including the complete optical system). Thus the IR filter can adopt a first position in which it is placed outside the casing 20 opposite the window 201 and a second position in which it is placed so as to not filter any electromagnetic radiation received by the IR system 3. In the first position, the IR filter is concave in shape turned towards the IR sensor 207 having a profile with a conical and/or aspherical base and reflecting the focal plane inside the casing 20 through the window 201, or, in a preferential mode, inside the cold screen 212 via the diaphragm 211. In terms of shape, each IR filter therefore has in cross-section in any secant plane containing the optical axis X a concave shape turned towards the IR sensor 207 having a profile with a conical and/or aspherical base. Each filter is moreover characterised by a predefined transmission coefficient T and can be placed on or outside an optical pathway of the lens system 40.

The IR system 3 comprises means for moving each IR filter. These movement means comprise for example, for an IR filter, a motor and an arm on which the IR filter is placed able or not to position the IR filter opposite the window 201.

In one embodiment, each IR filter can be inserted between the last lens of the lens system 40 (i.e. here the intermediate lens 201) and the window 201 at a position allowing to reflect the focal plane at least inside the casing 20 and preferentially inside the cold screen 212.

In one embodiment, the IR system 3 comprises a single IR filter 402.

In one embodiment, the IR filter 402 has a surface, any cross section of which through a plane containing the optical axis X is in the form of an ellipse truncated by a plane perpendicular to the optical axis X and generated by rotation about the optical axis.

In one embodiment, the IR filter 402 has a surface, the cross section of which through a plane containing the optical axis is in the form of a circle truncated by a plane perpendicular to the optical axis X and generated by rotation about the optical axis, a circle being a particular case of an ellipse.

In one embodiment, the IR filter 402 can adopt two positions in the IR system 3: in the first position, all the IR radiation reaching the IR sensor 207 has passed through the IR filter 402. The second position corresponds to an absence of an IR filter in the IR system 3. In this second position of the IR filter 402, the IR system 3 is therefore equivalent to the IR system 2 and therefore filters no electromagnetic radiation received by the IR system 3. Movement of the filter alternately into two different positions makes it possible to provide to the IR system 3 (i.e. to the IR sensor 207) two filling levels of the potential well of each detector of the IR sensor 207 that are different at the same integration time, which is equivalent to two acquisitions of images at two different black-body temperatures and allows calculation of the gain and of the offset value to apply to the values issuing from each detector.

In one embodiment, when the filter is in the first position, each focus of the ellipse of the cross section in the form of a truncated ellipse (or respectively of the circle of the cross section in the form of a truncated circle) of the IR filter 402 is placed on the edge of the window 201. Such a position of the foci of the ellipse of the cross section in the form of the truncated ellipse (or respectively of the circle of the cross section in the form of a truncated circle) makes it possible to ensure that the IR filter 402 reflects the focal plane inside the casing 20. This positioning of the foci of the ellipse of the cross section in the form of a truncated ellipse is hereinafter referred to as general positioning.

In one embodiment, when the filter is in the first position, each focus of the ellipse of the cross section in the form of a truncated ellipse (or respectively of the circle of the cross section in the form of a truncated circle) of the IR filter 402 is placed on the edge of the diaphragm 211. Such a positioning of the foci of the ellipse of the cross section in the form of an ellipse (or respectively of the circle of the cross section in the form of a circle) allows to ensure that the IR filter 402 reflects the focal plane inside the cold screen 212.

This positioning of the foci of the ellipse of the cross section in the form of a truncated ellipse is hereinafter referred to as optimum positioning.

In one embodiment, the positioning of the foci of the ellipse of the cross section in the form of a truncated ellipse of the IR filter 402 is determined using ray tracing techniques in order to ensure that the IR filter 402 reflects the focal plane inside the cold screen 212 or inside the casing 20.

Figure 4:
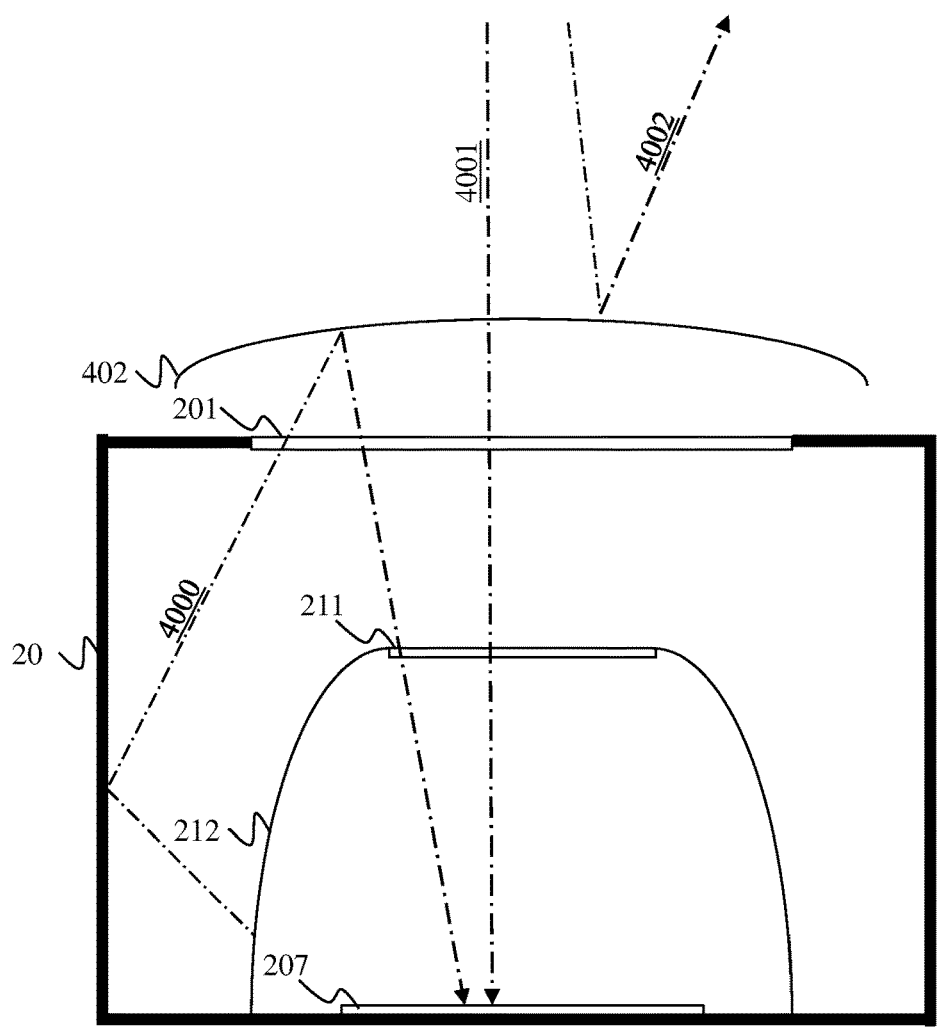
FIG. 4 shows a cross section view of a part of the infrared radiation detection system according to the invention.

FIG. 4 shows a simplified cross-sectional view of part of the infrared radiation detection system according to the invention.

The references that are common between FIG. 3 and FIG. 4 correspond to identical elements. It is considered in FIG. 4 that the IR filter 402 is in the first position. IR radiations 4000 to 4002 are shown in FIG. 4. Two cases are then to be distinguished.

In a first case, the foci of the cross section in the form of an ellipse are in the optimum positioning. In this case, all the IR radiation issuing from the lens system 30 and passing through the IR filter 402 (such as the IR radiation 4001) and all the IR radiation issuing from the inside of the casing 20 and reflected by the IR filter 402 (such as the IR radiation 4000 emitted by the cold screen 212) converges inside the cold screen 212. It should be noted that, with a transmission coefficient T, T % of the IR radiation issuing from the lens system 40 passes through the IR filter 402 and (100−T) % of the IR radiation issuing from the inside of the casing 20 is reflected by the IR filter 402. Likewise, (100−T) % of the IR radiation issuing from the lens system 40 is reflected by the IR filter 402 (such as the radiation 4002) and T % of the IR radiation issuing from the inside of the casing 20 passes through the IR filter 402.

In a second case, the foci of the cross section in the form of ellipse are in the general positioning. In this case, it is not possible to ensure that all the IR radiation issuing from inside the casing 20 and reflected by the IR filter 402 converges inside the cold screen 212. This is because some IR radiation issuing from the inside of the casing 20 could be reflected by the internal surface of the casing 20, which would cause stray radiation that could reach the IR sensor 207. To prevent this, it is necessary to specify the internal surface of the casing 20 to be reflective and the external surface of the cold screen 212 to be absorbent, for example a non-reflecting paint, an absorbent deposition or treatment, or a suitable diffuser.

In one embodiment, the transmission coefficient T is equal to 50%.

In one embodiment, the IR system 3 comprises a first and second IR filter, each associated with different transmission coefficients. The first IR filter is associated with a transmission coefficient $T_1$ for example equal to 30% and the second IR filter is associated with a transmission coefficient $T_2$ for example equal to 70%. Like the IR filter 302, the first and second IR filters can be moved into the first or into the second position. There then exists three configurations of the IR system 3: a first configuration in which the first and second filters are in the second position; a second configuration in which the first filter is in the first position and the second filter is in the second position; a third configuration in which the first filter is in the second position and the second filter is in the first position. These three configurations then allow a three-point calibration. With a single filter, the two-point calibration has performances similar to the three-point calibration, although different from the point of view of pixel correction, in that one of the measurements used for calculating the gain is also used for calculating the offset value.

FIG. 6 shows an example of a calibration method according to the invention.

The method in FIG. 6 is implemented by the processing module 213 of the IR system 3. The method in FIG. 6 can be initiated at any time by an operator, for example by pressing on a button (not shown) of the IR system 3. When the method is implemented, the IR system 3 displays the same scene throughout the duration of the method. In the example of FIG. 6, the IR system 3 comprises a single IR filter 402.

In a step 601, the processing module 213 transmits a command by moving the IR filter 402 so as to position the IR filter 402 in the first position.

In a step 602, the processing module 213 triggers an acquisition of a first matrix of values by the IR sensor 207, each value in the matrix of values coming from a detector of the IR sensor 207. Once acquired, the first matrix of values is stored in the storage unit 2134 of the processing module 213.

In a step 603, the processing module 213 transmits a command by moving the IR filter 402 so as to position the IR filter 402 in the second position.

In a step 604, the processing module 213 triggers an acquisition of a second matrix of values by the IR sensor 207. Once acquired, the second matrix of values is stored in the storage unit 2134 of the processing module 213.

In a step 605, the processing module carries out a two-point calibration of each detector of the IR sensor 207 in order to determine, for each detector, a gain and an offset value to be applied to the values issuing from said detector. Each two-point calibration of a detector uses a value of the first matrix corresponding to said detector and a value of the second matrix corresponding to said detector.

The method described in relation to FIG. 6 is applicable when the IR system 3 comprises more than one IR filter by alternately positioning each IR filter in the first or second position. When a filter is in the first position, each other filter is in the second position.

The invention claimed is:

1. An electromagnetic-radiation detection system comprising:
   a casing defining an enclosure in which a partial vacuum prevails, comprising a window transparent to said electromagnetic radiation;
   a cold finger having a side wall closed at one end by an end wall situated in line with the window;
   a sensor, mounted on the end wall, having a flat top surface disposed facing the window comprising detectors sensitive to electromagnetic radiation and cooled by the cold finger, said sensor defining an optical axis perpendicular to the flat top surface and centred with respect thereto;
   a cold screen surrounding the sensor, substantially in the form of a dome, mounted on the cold finger and generated by rotation about the optical axis, and comprising a top end, disposed between the window and the sensor, defining a circular-shaped diaphragm centred on the optical axis and a side wall connecting a base of the cold screen to the top end having an internal face with its concavity turned towards the optical axis;
   at least one bandpass electromagnetic-radiation filter having a predefined transmission coefficient, each filter being movable and being able to adopt a first position in which it is placed outside the casing facing the window and a second position in which it is placed so as to not filter any electromagnetic radiation received by the system, in said first position each filter has in cross section in any secant plane containing the optical axis a concave form turned towards the sensor having a profile with a conical and/or aspherical base and reflects the focal plane inside the casing; and
   processing means for evaluating, for each detector of the sensor, a gain and an offset value using a first value supplied by said detector when each filter is in the second position and at least one second value supplied by said detector when a filter among the at least one filter is in the first position.

2. The system according to claim 1, wherein at least one first filter among the at least one filter has a surface, any cross section of which through a plane containing the optical axis is in the form of an ellipse or a circle truncated by a plane perpendicular to the optical axis and generated by rotation about the optical axis.

3. The system according to claim 2, wherein at least one filter among the at least one filter reflects the focal plane inside the cold screen.

4. The system according to claim 3, wherein each focus of the ellipse of the cross section in the form of a truncated ellipse or of the circle of the cross section in the form of a truncated circle of the first filter is placed on the edge of the diaphragm.

5. The system according to claim 1, wherein each focus of the ellipse of the cross section in the form of a truncated ellipse or of the circle of the cross section in the form of a truncated circle of the first filter is placed on the edge of the window.

6. The system according to claim 1, wherein the casing comprises an internal surface reflecting the electromagnetic radiation and the cold screen comprises an external surface absorbing the electromagnetic radiation.

7. A method for calibrating detectors sensitive to electromagnetic radiation of a sensor used by the electromagnetic-radiation detection system according claim 1, wherein the method comprises:
   positioning a filter among the at least one filter in the first position;
   triggering an acquisition of a first matrix of values by the sensor, each value in the matrix of values issuing from a detector of the IR sensor;
   positioning said filter in the second position;
   triggering an acquisition of a second matrix of values by the sensor; and
   determining, for each detector of the sensor, a gain and an offset value to be applied to the values issuing from said detector, each determination of a gain and of an offset value of a detector uses a value of the first matrix corresponding to said detector and a value of the second matrix corresponding to said detector.

8. A non transitory information storage means, storing a computer program comprising program code instructions which can be loaded in a programmable device to cause said programmable device to implement the method according to claim 7, when the program code instructions are executed by a processor of said programmable device.

* * * * *